United States Patent
Hutchins et al.

(10) Patent No.: US 7,287,593 B2
(45) Date of Patent: Oct. 30, 2007

(54) METHODS OF FRACTURING FORMATIONS USING QUATERNARY AMINE SALTS AS VISCOSIFIERS

(75) Inventors: Richard D. Hutchins, Sugar Land, TX (US); Laura Schafer, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 71 days.

(21) Appl. No.: 11/256,467

(22) Filed: Oct. 21, 2005

(65) Prior Publication Data
US 2007/0089881 A1    Apr. 26, 2007

(51) Int. Cl.
*E21B 43/26* (2006.01)
(52) U.S. Cl. .............. 166/308.5; 166/300; 166/305.1
(58) Field of Classification Search .............. None
See application file for complete search history.

(56) References Cited

U.S. PATENT DOCUMENTS

| | | | | |
|---|---|---|---|---|
| 4,480,696 | A * | 11/1984 | Almond et al. | 166/308.6 |
| 4,627,495 | A * | 12/1986 | Harris et al. | 166/280.1 |
| 5,249,627 | A * | 10/1993 | Harms et al. | 166/308.2 |
| 5,330,005 | A * | 7/1994 | Card et al. | 166/280.2 |
| 5,551,516 | A * | 9/1996 | Norman et al. | 166/308.2 |
| 5,575,335 | A * | 11/1996 | King | 166/308.5 |
| 6,024,170 | A * | 2/2000 | McCabe et al. | 166/300 |
| 6,172,010 | B1 | 1/2001 | Argillier et al. | 507/102 |
| 6,383,990 | B1 | 5/2002 | Dawson et al. | 507/209 |
| 6,435,277 | B1 * | 8/2002 | Qu et al. | 166/281 |
| 6,810,959 | B1 * | 11/2004 | Qu et al. | 166/300 |
| 2004/0209780 | A1 | 10/2004 | Harris et al. | 507/117 |
| 2007/0039733 | A1 * | 2/2007 | Welton et al. | 166/276 |

FOREIGN PATENT DOCUMENTS

EP    0962626    2/2003

OTHER PUBLICATIONS

Bulk and Surface Behavior of Cationic Guars in Solutions of Oppositely Charged Surfactants—O. Anthony, C.M. Marques, and P. Richetti—1998 American Chemical Society.

* cited by examiner

*Primary Examiner*—Jennifer H. Gay
*Assistant Examiner*—Angela DiTrani
(74) *Attorney, Agent, or Firm*—David Cate; Darla Fonseca; Robin Nava

(57) ABSTRACT

Treatment methods including preparation of an aqueous treatment fluid composition composed of a carboxy modified polymer, a crosslinking agent, and a viscosifying quaternary amine salt, and subsequently introducing the composition into a the formation to treat. The treatment method is particularly useful for fracturing a subterranean formation. The polymer and crosslinker may be premixed and injected into a wellbore, then mixed therein with the quaternary amine salt to treat the formation. In another aspect, the polymer, crosslinker, and quaternary amine salt are mixed, injected into a wellbore, and introduced in the formation for treatment.

16 Claims, 2 Drawing Sheets

METHODS OF FRACTURING FORMATIONS USING QUATERNARY AMINE SALTS AS VISCOSIFIERS

BACKGROUND OF THE INVENTION

This invention relates to fluids used in treating a subterranean formation. In particular, the invention relates to methods for treating subterranean formations including preparing an aqueous treatment fluid composition composed of a carboxy modified polymer, a crosslinking agent, and quaternary amine, then treating the subterranean formation with the fluid composition. The treatment method is particularly useful for fracturing a subterranean formation.

Various types of fluids are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The fluids employed in these oilfield operations are known as drilling fluids, completion fluids, work-over fluids, packer fluids, fracturing fluids, stimulation fluids, conformance or permeability control fluids, consolidation fluids, and the like.

Hydraulic fracturing operation is a stimulation technique routinely performed on oil and gas wells to increase fluid production from subterranean reservoirs. Specially engineered fluids are pumped at high pressures and rates into the reservoir to be treated, causing a fracture to open. Proppants, such as ceramic beads or grains of sand, are slurried with the fracturing fluid (also referred to as carrier fluid) to keep the fracture open once the treatment is completed. Because of their low cost, high performance and ease of handling, polymer-based fluids are the most widely used fracturing fluids for hydraulic fracturing operations. Most commonly used polymers include guar, guar derivative, cellulose, and cellulose derivative based polymers.

In some instances, polymers used to form the fluid are crosslinked with a crosslinker, such as titanium, boron, or zirconium, in order to provide adequate viscosity to hydraulically fracture the formation. Often, when some crosslinked polymer fluids are pumped into a wellbore to treat the formation, as a result of exposure to pumping and transport forces, the fluids may exhibit shear thinning behavior with limited or no viscosity recovery when the shear rate is decreased. This is especially the case with zirconium crosslinked polymer based systems. Such shear thinning behavior commonly leads to significant leak-off of the treatment fluid into the formation A typical approach to partially alleviate irreversible shear thinning effects is increasing the crosslinked polymer concentration of the treatment fluid. While this may be effective for improving viscosity, this may lead to other difficulties. Generally, as polymer levels are increased, material requirements increase as well. Further, elevating the polymer concentration commonly leads to a corresponding reduction in retained conductivity after the treatment operation.

Thus the need exists for oilfield treatment fluids which provide high retained conductivity after treatment, as well as improved viscosity recovery after shear thinning. A fluid that can achieve this would be highly desirable, and these needs are met at least in part by the following invention.

SUMMARY OF THE INVENTION

In one aspect the invention provides methods of treating a subterranean formation. In particular, the invention relates to methods for treating subterranean formations including preparing an aqueous treatment fluid composition composed of a carboxy modified polymer, a crosslinking agent, and quaternary amine salt, then treating the subterranean formation with the fluid composition. The treatment method is particularly useful for fracturing a subterranean formation. The polymer and crosslinker may be premixed and injected into a wellbore, then mixed therein with the quaternary amine salt to treat the formation. In another aspect of the invention, the polymer, crosslinker, and quaternary amine salt are mixed, injected into a wellbore, and introduced in the formation for treating.

In yet another embodiment of the invention, the treatment method includes preparing a treatment fluid composition which includes an aqueous medium, a carboxy modified polymer, and a crosslinking agent. The treatment fluid and crosslinking agent may be combined using any suitable means. For example, the treatment fluid and crosslinking agent may be mixed at the surface, and then injected into a wellbore penetrating a subterranean formation. A quaternary amine is then injected into the treating fluid and mixed with the treatment fluid to enhance the viscosity properties of the fracturing fluid composition. Alternatively, the treatment fluid may first be injected into the wellbore, and quaternary amine mixed downhole with the treatment fluid.

Carboxy modified polymers useful in the present invention include those such as carboxymethylguar (CMG), carboxymethylhydroxypropylguar (CMHPG), carboxymethylhydroxyethyl cellulose (CMHEC), or even carboxy containing polyacrylamide. Suitable crosslinkers may comprise a chemical compound containing a polyvalent metal ion such as, but not necessarily limited to, chromium, iron, aluminum, titanium, and zirconium. The quaternary amine salt may be any salt effective in increasing the viscosity of the treatment fluid, including a salt such as alkyl ethoxylated quaternary ammonium chloride.

BRIEF DESCRIPTION OF THE DRAWINGS

The invention may be understood by reference to the following description taken in conjunction with the accompanying drawings.

DETAILED DESCRIPTION OF THE PREFERRED EMBODIMENTS

Figure 1:
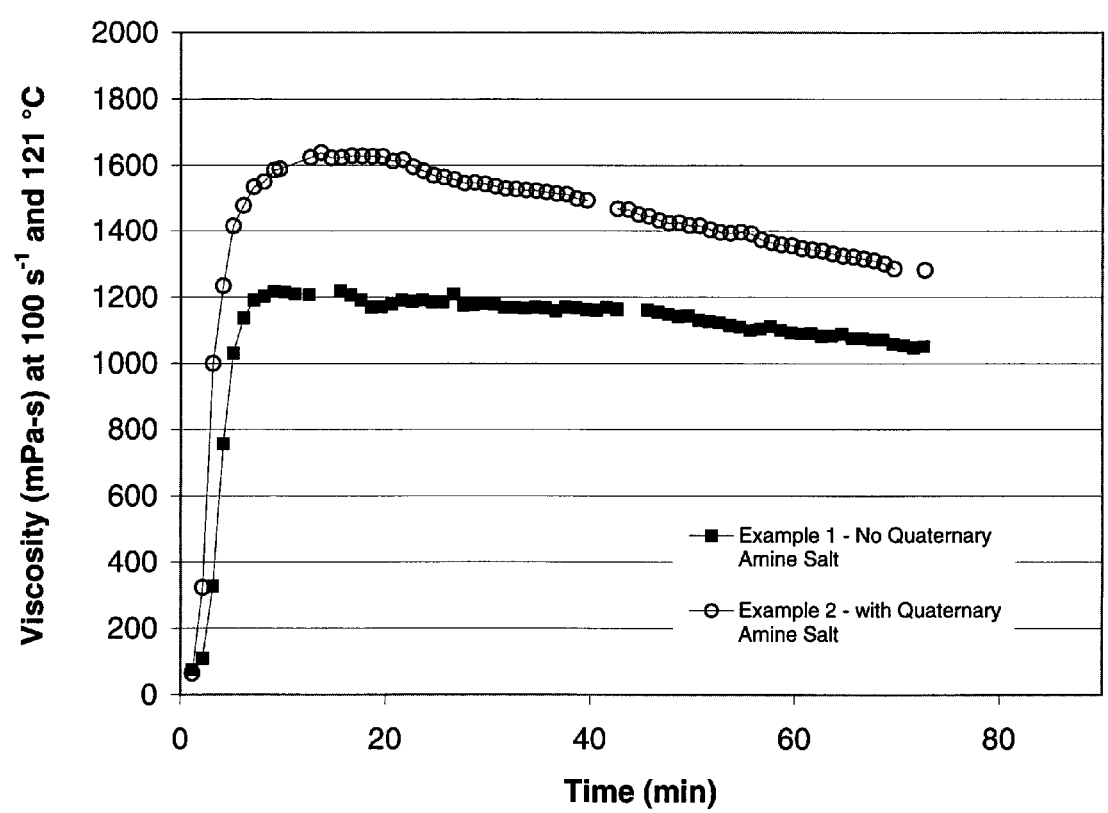
FIG. 1 shows adding a quaternary amine salt significantly increases the viscosity of the treatment fluid, particularly over an extended period of time at constant shear rate.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context.

The invention provides methods for treating a subterranean formation penetrated by a wellbore. In particular, the invention relates to methods for treating subterranean formations including preparing an aqueous treatment fluid composition composed of a carboxy modified polymer, then adding either a crosslinking agent or quaternary amine, and treating the subterranean formation with the fluid composition. Methods of the invention are useful in oilfield operations, including such operations as fracturing subterranean formations, modifying the permeability of subterranean formations, fracture or wellbore cleanup, acid fracturing, matrix acidizing, gravel packing or sand control, and the like. The treatment method is particularly useful for fracturing a subterranean formation.

The inventors have unexpectedly discovered that adding a material such as a quaternary amine salt to a treatment fluid which includes an anionic functional polymer, such as a carboxy modified polymer, and crosslinking agent, provides enhanced viscosity properties such as recovery from shear thinning after the fluid is injected into the wellbore, delayed viscosity increase, or viscosity increase after the treatment fluid is introduced into the formation. Inventors have also unexpectedly discovered that adding the crosslinking agent to a treatment fluid comprising an anionic functional polymer, such as a carboxy modified polymer, and quaternary amine salt also provides like viscosity enhancement. In both instances, a reduction in polymer concentration is made possible which leads to improvements in formation clean-up and material usage.

In one embodiment of the invention, a method of treating a subterranean formation includes first preparing a treatment fluid composition composed of an aqueous medium, a carboxy modified polymer, and a crosslinking agent. A quaternary amine salt is then added to the treatment fluid composition whereby viscosity is enhanced. Subsequently, the combination of the quaternary amine salt and the treatment fluid composition is introduced into a subterranean formation to treat the formation, preferably to fracture the formation. This embodiment exhibits improved shear recovery over crosslinked polymers typically used in fracturing treatments in that the viscosity of the fluid after exposure to a high shear environment (representative fracturing tubular shear rates range from about 650 to 1300 s$^{-1}$) is significantly higher than that of the same fluid formulation without quaternary amine salt.

In another embodiment of the invention, the treatment method includes preparing a treatment fluid composition which includes an aqueous medium, a carboxy modified polymer, and a quaternary amine. The treatment fluid and quaternary amine salt may be combined using any suitable means. For example, the treatment fluid and quaternary amine may be mixed at the surface, and then injected a wellbore penetrating a subterranean formation. A crosslinking agent is then injected into the treating fluid and mixed with the treatment fluid to enhance the viscosity properties of the fracturing fluid composition. Alternatively, the treatment fluid may first be injected into the wellbore, and crosslinking agent mixed downhole with the treatment fluid.

The carboxy modified polymer used in methods of the invention may be based upon any suitable polymer. Non limiting examples of such polymers include guars, celluloses, synthetic polymers such as polyacrylamides, synthetic and natural water soluble polymers, and the like. Particularly useful carboxy modified polymers include carboxymethylguar (CMG), carboxymethylhydroxypropylguar (CM-HPG), carboxymethylhydroxyethyl cellulose (CMHEC), and carboxy modified polyacrylamide. While any suitable amount of carboxy modified polymer may be used, the polymer is preferably incorporated in an amount from about 0.01% to about 10.00% by weight of the composition total composition weight, more preferably from about 0.10% to about 2.0% by weight of the total composition weight.

Crosslinking agents are used in methods of the invention, either as a component of the treatment fluid, or as material added in the wellbore to the treatment fluid to provide viscosity enhancement. Crosslinking consists of the attachment of two or more polymeric chains through the chemical association of such chains to a common element or chemical group. Suitable crosslinkers may comprise a chemical compound containing a polyvalent metal ion such as, but not necessarily limited to, chromium, iron, aluminum, titanium, and zirconium. The crosslinking agent may be added in any effective amount. Preferably, the active amount of crosslinker agent is in the range from about 0.001% to about 0.2% by weight of total composition weight, more preferably from about 0.003% to about 0.1% by weight of total composition weight.

Methods of the invention include adding a cationic associative quaternary amine salt to the treatment fluid, either as a component of the fluid, or as a downhole addition to the treatment fluid. Some quaternary amine salts useful in the invention include those represented by the formula:

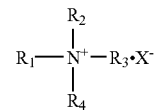

wherein $R_1$ is an alkyl group containing from about 8 to about 30 carbon atoms and may be branched or straight chained; $R_2$ is the same as $R_1$, an aromatic, or a methyl group; $R_3$ is the same as $R_1$, the same as $R_2$, or a methyl group; $R_4$ is a methyl group, and X is a halide selected from chloride, bromide or fluoride. The quaternary amine salt may even include alkyl ethoxylated quaternary methyl ammonium chloride salts represented by the formula:

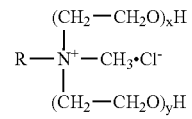

Preferred quaternary amine salts include, but are not necessarily limited to, di-(hydrogenated tallowalkyl) dimethyl ammonium chloride, cocoalkyltrimethyl ammonium chloride, benzyldimethylcocoalkyl ammonium chloride, benzylbis(2-hydroxyethyl)cocoalkyl ammonium chloride, alkyl (C12-16) dimethyl benzyl ammonium chloride, and coco benzyl ammonium chloride ethoxylate. A particular useful quaternary amine salt is cocobis(2-hydroxyethyl) methyl ammonium chloride. The quaternary amine salt may be added in any amount effective in enhancing viscosity properties, either over time at constant shear rate or recovery after exposure to high shear rates. Preferably, the amine salt is added in the amount from about 0.005% to about 1% by weight of total composition weight, more preferably from about 0.01% to about 0.5% by weight of total composition weight. The amine salt may be added in any effective form including a liquid form, a solid form, or a solution such as an aqueous salt solution.

The compositions used in methods of the invention may include an electrolyte that may be an organic acid, organic acid salt, or inorganic salt. Mixtures of the above members are specifically contemplated as falling within the scope of the invention. This member will typically be present in a minor amount, preferably less than about 30% by weight of the composition.

The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4-dichlorobenzoic acid. Organic acid salts such as cesium, sodium or potassium formate or sodium citrate can be used.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may be used. Any mixture of inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In a preferred embodiment of the invention, the inorganic salt is potassium chloride. The inorganic salt is preferably used in an amount of from about 0.001 wt % to about 12.0 wt % of the total weight, and more preferably less than 1 wt % of the total weight.

Embodiments of the invention may also include compositions comprising an organoamino compound. Examples of suitable organoamnino compounds include, but are not necessarily limited to, tetraethylenepentamine, triethylenetetramine, pentaethylenhexamine, triethanolamine, and the like, or any mixtures thereof. When organoamino compounds are used in fluids of the invention, they are incorporated at an amount from about 0.01 wt % to about 2.0 wt % based on total weight. Preferably, when used, the organoamino compound is incorporated at an amount from about 0.05 wt % to about 1.0 wt % based on total weight. A particularly useful organoamino compound is tetraethylenepentamine.

Compositions used in methods according to the invention also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanent positively charged moiety in the molecule regardless of pH and a negatively charged moiety at alkaline pH. In some embodiments of the invention, the surfactant is a cationic, zwitterionic or amphoteric surfactant containing amine group or a quaternary ammonium group in its chemical structure ("amine functional surfactant"). A particularly useful surfactant is the amphoteric alkyl amine contained in the surfactant solution AQUAT 944® (an amphoteric alkyl amine solution available from Baker Petrolite of 12645 W. Airport Blvd, Sugar Land, 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used. Preferably the fluids incorporate the surfactant or blend of surfactants in an amount of about 0.02 wt % to about 5 wt % of total weight, and more preferably from about 0.05 wt % to about 2 wt % of total weight.

Friction reducers may also be incorporated into compositions used in methods of the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Compositions useful in the invention may also be used with or contain a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself.

Embodiments of the invention may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 12 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particle processing, etc.

The concentration of proppant in the fluid can be any concentration known in the art, and will preferably be in the range of from about 0.05 to about 3 kilograms of proppant added per liter of composition. Also, any of the proppant particles can further be coated with a resin to potentially improve the strength, clustering ability, and flow back properties of the proppant.

The aqueous medium used in embodiments of the invention may be water or brine. In those embodiments of the invention where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

A fiber component may be included in the compositions useful in methods of the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used, the fiber component may be included at concentrations from about 1 to about 15 grams per liter of the composition, preferably the concentration of fibers are from about 2 to about 12 grams per liter of composition, and more preferably from about 2 to about 10 grams per liter of composition.

Compositions used according to the invention may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, and biocides such as 2,2-dibromo-3-nitrilopropionamine.

Some embodiments of the invention include the use of compositions in accordance with the invention for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation.

In most cases, a hydraulic fracturing treatment consists of pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added.

In another embodiment, the present invention relates to use of compositions based on the invention for gravel packing a wellbore. As a gravel packing composition, it preferably comprises gravel or sand and other optional additives such as filter cake clean up reagents such as chelating agents or acids (e.g. hydrochloric, hydrofluoric, formic, acetic, citric acid), corrosion inhibitors, scale inhibitors, biocides, leak-off control agents, among others. For this application, suitable gravel or sand is typically having a mesh size between 8 and 70 U.S. Standard Sieve Series mesh.

The following examples are presented to illustrate the preparation and properties of well treatment fluids composed of a carboxy modified polymer, a crosslinking agent, and quaternary amine used in methods according to the invention, and should not be construed to limit the scope of the invention, unless otherwise expressly indicated in the appended claims. All percentages, concentrations, ratios, parts, etc. are by weight unless otherwise noted or apparent from the context of their use.

EXAMPLES

The following examples illustrate the compositions and methods of the invention, as described in the preferred embodiments.

To prepare examples 1 and 2, a common fluid was prepared by initially mixing 500 ml de-ionized water, 1.8 grams of carboxymethylhydroxypropyl guar, and 0.25 ml of a 1:1 weight mixture of sodium acetate in water. This mixture was hydrated by mixing for 15 minutes at approximately 1500 to 2500 rpm in a Waring blender. Subsequently, 0.36 grams of sodium sesquicarbonate inorganic salt, 1.74 grams of sodium bicarbonate, and 1.5 ml of tetraethylenepentamine were tadded, followed by 4.5 ml of a mixture including sodium zirconium lactate (22.6% by wt), methanol (13.6% by wt), and water (63.8% by wt). Then, to complete the common fluid, 0.5 ml of a mixture composed of dimethyl benzyl ammonium chloride (51% by wt), ethanol (10% by wt), and water (39% by wt) was added, and the fluid was mixed at the same rate for about 30 seconds. To measure viscosity of the examples, a 32 ml sample of each was loaded into a rheometer cup. The cup was attached to a couette-style rheometer with a R1-B5 configuration and 300 psi head pressure applied. For examples presented, a Grace M5500 Rheometer was used.

Examples 1 and 2 illustrate the viscosity enhancement of incorporating a quaternary amine salt into a zirconium crosslinked carboxymethylhydroxypropyl guar based treatment fluid. The ingredients used to prepare the fluids for examples 1 and 2 are given in Table 1.

TABLE 1

| Ingredient | Ex. 1 | Ex. 2 |
|---|---|---|
| Common Fluid | 100% by vol. | 99.9% by vol. |
| ETHOQUAD ® C/12B quaternary amine salt | — | 0.1% by vol. |
| Measured pH | 10 | 10 |

Example 1 is a control example without an addition of viscosity extender, while example 2 includes a quaternary amine salt, ETHOQUAD® C/12B (cocobis(2-hydroxyethyl)methyl ammonium chloride available from Akzo Nobel), to illustrate the viscosity advantages. The fluids were evaluated for viscosity at about 121° C. FIG. 1 clearly shows that adding a quaternary amine salt, significantly increases the viscosity of the treatment fluid, particularly over an extended period of time at constant shear rate.

Figure 2:
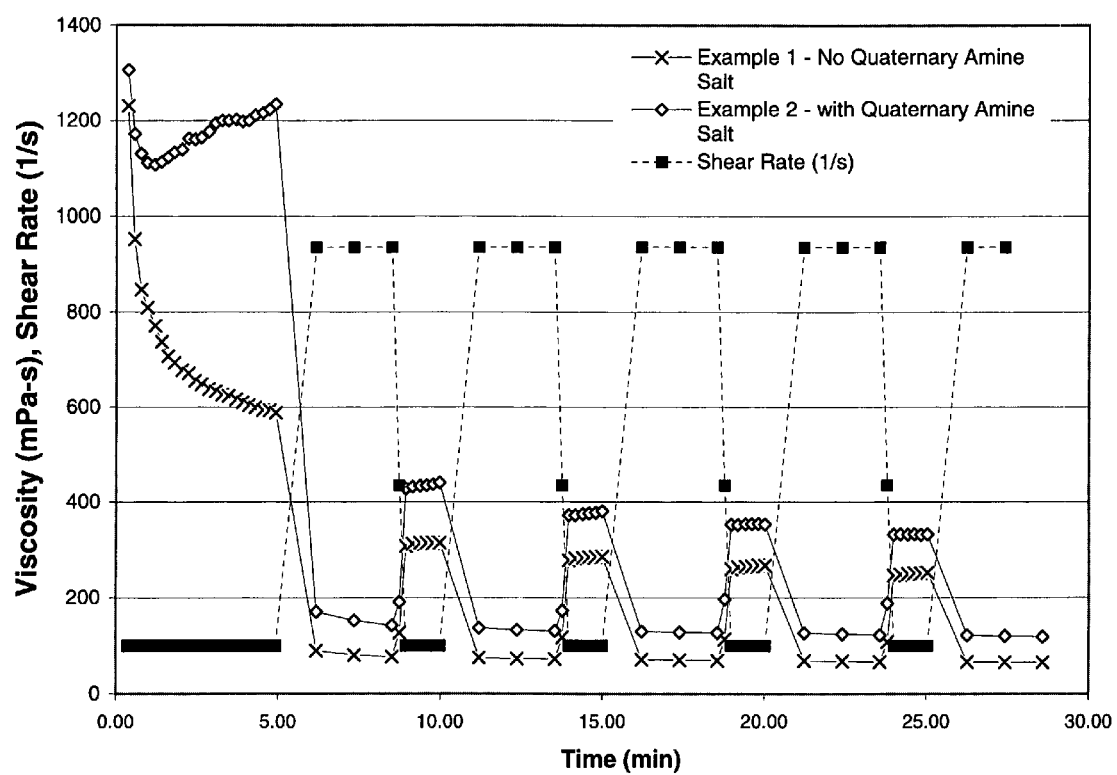
FIG. 2 illustrates the recovery in viscosity properties after high shearing of fluids used in accordance with the invention.

In a shear recovery test conducted on fluid examples 1 and 2, the shear rate was set to 100 sec$^{-1}$ and temperature increased to 149° C. The shear recovery rheometer test procedure consisted of five minutes of 100 sec$^{-1}$ shear followed by one minute of 935 sec$^{-1}$ shear at 24° C. temperature. This was repeated five times to dramatize any shear degradation. Results are presented in FIG. 2. As FIG. 2 illustrates, the recovery in viscosity properties (viscosity increase after decreased shear rate) is significantly improved with the incorporation of the quaternary amine salt. In both FIGS. 1 and 2, it is apparent that small amounts of quaternary amine salt are effective in significantly enhancing the viscosity properties, giving an increase from about 10% to about 40%, both as measured over time at a constant shear rate, FIG. 1, and after high shear tests, FIG. 2.

The particular embodiments disclosed above are illustrative only, as the invention may be modified and practiced in different but equivalent manners apparent to those skilled in the art having the benefit of the teachings herein. Furthermore, no limitations are intended to the details as herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of fracturing a subterranean formation comprising:
    preparing a treatment fluid composition comprising an aqueous medium, a carboxy modified polymer, and a crosslinking agent;
    adding a viscosity enhancing amount of quaternary amine salt to the treatment fluid, wherein the quaternary amine salt is selected from the group consisting of benzyldimethylcocoalkyl ammonium chloride, benzylbis(2-hydroxyethyl)cocoalkyl ammonium chloride, alkyl (C12-16) dimethyl benzyl ammonium chloride, coco benzyl ammonium chloride ethoxylate, and any mixtures thereof, provided the fluid does not comprise a viscoelastic surfactant; and,
    introducing the combination of the quaternary amine salt and the treatment fluid composition into a subterranean formation to fracture the formation.

2. The method according to claim 1 wherein the carboxy modified polymer is selected from the group consisting of carboxymethylguar (CMG), carboxymethylhydroxypropylguar (CMHPG), carboxymethylhydroxyethyl cellulose (CMHEC), and carboxy modified polyacrylamide.

3. The method according to claim 1 wherein the quaternary amine salt is cocobis(2-hydroxyethyl)methyl ammonium chloride.

4. The method according to claim 1 further comprising a gas component selected from the group consisting of carbon dioxide, nitrogen and any mixtures thereof.

5. The method according to claim 1 further comprising a proppant.

6. The method according to claim 5 wherein the proppant is selected from the group consisting of sand, walnut shells, sintered bauxite, glass beads, ceramic materials, naturally occurring materials, or any mixtures thereof.

7. The method according to claim 1 wherein the crosslinking agent contains a metal ion selected from the group consisting of chromium, iron, aluminum, antimony, titanium, and zirconium.

8. The method according to claim 1 further comprising a fiber component.

9. The method according to claim 1 wherein the fluid composition comprises a corrosion inhibitor, fluid-loss additive, and mixtures thereof.

10. The method according to claim 1 wherein the quaternary amine salt is added in an amount of from about 0.005% to about 1% by weight of the composition weight.

11. The method according to claim 1 wherein the quaternary amine salt is added in an amount of from about 0.01% to about 0.5% by weight of the composition weight.

12. The method according to claim 1 wherein the treatment fluid composition is prepared and mixed with the quaternary amine salt prior to introduction into a wellbore for treating the subterranean formation.

13. The method according to claim 1 wherein the treatment fluid viscosity is increased from about 10% to about 40% with the addition of the quaternary amine salt.

14. A method of fracturing a subterranean formation comprising:

preparing a treatment fluid composition comprising an aqueous medium, a carboxy modified polymer, and a viscosity enhancing amount of quaternary amine salt, wherein the quaternary amine salt is selected from the group consisting of benzyldimethylcocoalkyl ammonium chloride, benzylbis(2-hydroxyethyl)cocoalkyl ammonium chloride, alkyl (C12-16) dimethyl benzyl ammonium chloride, coco benzyl ammonium chloride ethoxylate, and any mixtures thereof, provided the amine salt is not a viscoelastic surfactant;

adding a crosslinking agent; and, introducing the combination of the crosslinking agent and the treatment fluid composition into a subterranean formation to treat the formation.

15. The method according to claim 14 wherein the carboxy modified polymer is selected from the group consisting of carboxymethylguar (CMG), carboxymethylhydroxypropylguar (CMHPG), carboxymethylhydroxyethyl cellulose (CMHEC), and carboxy modified polyacrylamide.

16. The method according to claim 14 wherein the crosslinking agent contains a metal ion selected from the group consisting of chromium, iron, aluminum, antimony, titanium, and zirconium.

* * * * *